United States Patent Office 3,639,504
Patented Feb. 1, 1972

3,639,504
PROCESS FOR PREPARING HARDENED POLYESTER RESINS USING MIXTURES OF ORGANIC METAL DERIVATIVES OF VANADIUM AND ZIRCONIUM AS ACCELERATORS
Teo Paleologo and Silvio Vargiu, Milan, Italy, assignors to Società Italiana Resine S.p.A., Milan, Italy
No Drawing. Filed July 10, 1968, Ser. No. 743,606
Claims priority, application Italy, July 17, 1967, 18,472/67
Int. Cl. C08f 21/02
U.S. Cl. 260—863        5 Claims

ABSTRACT OF THE DISCLOSURE

Unsaturated polyester resins are hardened in the presence of peroxide catalysts and mixtures of organic metal derivatives of vanadium and zirconium as accelerators.

---

The invention relates to processes for hardening unsaturated polyester resins.

The term polyester resins is to be understood as meaning polycondensation products of dicarboxylic acids and dihydric alcohols, a non-aromatic unsaturation being present in either of or both the acid and the alcohol, and includes the modified products which are obtained when monocarboxylic acids or monohydric alcohols, or small quantities of polycarboxylic acids or polyhydric alcohols, are present when the polycondensation is carried out.

Generally, saturated glycols are polymerized with unsaturated dicarboxylic acids, for example, maleic and fumaric acid.

Hardening of unsaturated polyester can be carried out in the presence of an unsaturated monomer capable of co-polymerizing with the polyester. Suitable monomers for this purpose are of the acryl or vinyl type, such as styrene.

The rate of hardening of unsaturated polyester resins is increased by the addition of substances of the peroxide type, such as peroxides or hydroperoxides; however, when operation at low temperature is desired, a metal accelerator should be added, such as cobalt, vanadium or manganese, generally in the form of organic acid salts. The use of these metal accelerators is subject to various drawbacks, more particularly products hardened in the presence of cobalt and vanadium salts often show undesirable colouring, whereas when manganese salts are employed, in addition to the colouring, products are obtained which are not thoroughly hardened.

According to the invention the above drawbacks may be mitigated or avoided by utilizing as hardening accelerators combinations of vanadium and zirconium in the form of organic derivatives such as acetylacetonates or salts or organic acids such as octoates or naphthanates.

By the process of the invention therefore hardening of the unsaturated polyester resins or, better, compositions of unsaturated polyester resins and copolymerizable monomers is effected by using a catalytic system comprising a peroxide catalyst and an accelerator consisting of a combination of organic derivatives of vanadium and zirconium.

The process of the invention avoids undersiable colouring and gives polyester resin products which are thoroughly hardened, which is all the more surprising as it was believed that a plurality of metal accelerators combined together would give to the finished product, all other conditions being the same, a lower hardness than one metal accelerator only.

A further advantage of the process consists in obtaining at low temperature over short periods glass-polyester artefacts, more particularly in the form of laminates, in which the glass fiber and hardened resin adhere well to each other. This is more particularly important, inasmuch as one of the prominent uses of unsaturated polyester resins is the manufacture of glass-fiber reinforced plastics.

For the purposes of this invention any polyester of the above described types may be employed in combination with at least once copolymerizable monomer of the vinyl or acryl type, the said monomer being in a quantity of 10% to 70% by weight with respect to the polyester.

Peroxide compounds, useful as catalysts, may be of the peroxide or hydroperoxide type, such as cumene hydroperoxide, methylethylketone peroxide, terbutylperoxide and methylisobutylketone peroxide.

These peroxides are added in quantities of 0.5 to 3.0% by weight with respect to the polyester-unsaturated monomer composition, whereas the metal accelerator is preferably added in quantities or 0.007 to 0.07% by weight, the value being calculated with respect to the metal, with a vanadium/zirconium ratio preferably between 1:02 and 1:2, still calculated with respect to the metal.

The invention is illustrated by the following examples.

EXAMPLE 1

In an inert gas medium phthalic anhydride, maleic anhydride and propylene glycol are reacted in a ratio, expressed in equivalents, of 1:1:2–1 at a temperature of 180–200° C. The reaction is pursued till the product, dissolved in toluene in a quantity equalling 30% by weight with respect to the resin is of a Gardner viscosity at 25° C. equalling T—.

Stabilization is then carried out by adding hydroquinone, followed by dissolving in styrene in such manner that the monomer is present by a quantity of 37% by weight with respect to the total mass.

The resulting product is of the following properties:
Viscosity 25° C.: 250 cps.
Styrene content: 37% by weight.

In the following tests the product, in combination with a further quantity of styrene monomer in a weight ratio of 5:1, containing the peroxide catalyst and metal accelerator, is employed for impregnating a glass fiber mat known in the trade as "450 AS." The impregnated mat is then laid between sheets of the product known by the trade name "Mylar" and introduced between two thermostated plates at 40° C., held slightly spaced from the mat. The sample is removed after 40 minutes, allowed to cool for 10 minutes at room temperature, released from the Mylar sheets and analyzed.

The tests employed as accelerators cobalt octoate, vanadium octoate (both by way of comparison) and a vanadyl acetylacetonate and zirconium octoate combination; cumene hydroperoxide and methylethylketone peroxide were employed as catalysts.

Table 1 summarizes the results of the tests, giving the values of Barcol hardness (measured on the laminate immediately after cooling for ten minutes at room temperature), the aspect of the surface and contrast of the resin with respect to the glass fiber. It will be seen that the accelerator percentages are referred to the metal and are given by percent by weight with respect to the unsaturated polyester-styrene composition.

The percentages of the peroxide catalysts are likewise referred to the unsaturated polyester-styrene composition, by peroxide catalysts compositions being understood of a concentration of 70% in the case of cumene hydroperoxide and 50% in the case of methylethylketone peroxide.

It should be noted that the metal accelerators are added to the unsaturated polyester-styrene composition dissolved in suitable organic solvents, such as chloroform, in order to improve homogenization.

It should finally be noted that, while the described tests employing cobalt or vanadium-zirconium accelerators give colourless laminates, with vanadium accelerators colouring is present even at low concentrations of the accelerators and becomes gradually stronger as the concentration thereof increases.

method, all colors can be matched by some combination of three primary colors. The primary stimuli, X, Y, and Z, are fixed by agreement, and all other colors are regarded as containing fractional amounts of these three values depending on the characteristics of the color to be measured. For example, if two samples were found to have identical X, Y, and Z values, these colors would match providing conditions of lighting, viewing, pig-

TABLE 1

| Resin [1] | 1st accelerator (percent by weight) | | 2nd accelerator (percent by weight) | | Catalyst (percent by weight) | Laminate | | |
|---|---|---|---|---|---|---|---|---|
| | | | | | | Aspect of the surface | Barcol hardness | Visibility of the glass fibers |
| 100 | Co octoate | 0.12 | | | Methylethylketone peroxide | 2 Very bad. | 0'' | Normal. |
| | Va octoate | 0.0067 | | | Cumene hydroperoxide | 1 Pretty bad. | 23'' | Strong. |
| | do | 0.02 | | | do | 1 Fair | 31'' | Do. |
| | do | 0.033 | | | do | 1 Good | 40'' | Very strong. |
| | do | 0.04 | | | do | 1 do | 44'' | Do. |
| | Vanadyl acetylacetonate. | 0.016 | Zr octoate | 0.0083 | do | 1 do | 42'' | Normal. |
| | do | 0.020 | do | 0.0083 | do | 1 do | 44'' | Do. |

[1] Plus styrene, parts by weight.

EXAMPLE 2

A polymerizate from phthalic anhydride, maleic anhydride and propyleneglycol is prepared in the manner described in Example 1 and is dissolved on completion of reaction in styrene monomer, giving a product of the following properties:

Viscosity 25° C.: 350
Styrene content: 37% by weight

Utilizing the resin described in the third example in combination with a further quantity of styrene monomer (weight ratio 5/1) glass-resin stratified laminates are prepared in the form of test samples of the size 10 x 10 x 0.2 cm. by impregnating three layers of glass fiber mat.

The glass-resin laminates are manufactured between two sheets of the material known by the trade name "Mylar" and are past through a calibrated aperture to bring them to a constant thickness. Gelification is effected at 10° C., whereupon the samples are treated for two hours at 100° C. and conditioned at room tempertaure for 24 hours.

Cobalt naphthenates, vanadium octoates and vanadium octoate and zirconium octoate combinations are used as accelerators. The hardening catalysts comprise cumene hydroperoxide, methylethylketoneperoxide and the peroxide product known in the trade by the name "Luperox 224" distributed by Wallace & Tiernan.

The data are as summarized in Table 2 in the form of parts by weight, the quantity of accelerator being referred to the metal.

mentation, etc. were the same. The X, Y and Z primaries can be considered to be parallel to red (X), green (Y), and blue (Z) colors. From these values, trichromatic coordinates x, y and z can be calculated. The X and Y coordinates of the C.I.E. system define any position on the chromaticity diagram. When a third variable, the tri-stimulus Y value (lightness), is coupled with the chromaticity diagram, the combination defines the construction of the C.I.E. color solid. Thus with the C.I.E. method, the location within the solid, of any imaginable color, can be ascertained through a knowledge of the chromaticity coordinates and lightness.

The samples are supported on Vitrolite 1251B and black plate.

Tables 3 summarizes the results.

TABLE 3

| | Coordinates | | |
|---|---|---|---|
| | X | Y | Y CIE |
| Test number: | | | |
| 1 | 0.31215 | 0.32350 | 30.88 |
| 2 | 0.31478 | 0.32933 | 29.07 |
| 3 | 0.31843 | 0.33560 | 30.93 |
| 4 | 0.32691 | 0.34638 | 37.56 |

What is claimed is:
1. In a process of curing mixtures of an unsaturated

TABLE 2

| Test | Resin | Styrene monomer | Co naphth. | Va octoate | Zr octoate | Methylethylketone peroxide | Luperox 224 | Cumene hydroperoxide |
|---|---|---|---|---|---|---|---|---|
| 1 | 100 | 20 | 0.12 | | | 2.4 | | |
| 2 | 100 | 20 | 0.12 | | | | 2.4 | |
| 3 | 100 | 20 | | 0.04 | | | | 1 |
| 4 | 100 | 20 | | 0.04 | 0.02 | | | 1 |

Finally, the colour is determined by the C.I.E. method, with a Colour-Eye Model D–1 apparatus employing the illuminant C, in comparison with Vitrolite Standard 1251A with correction factors referred to barium sulphate. The C.I.E. method is a method for determining the color difference, which is described in "Instruction Manual 50–55A for the model NS Color Eye" Kollmorgen Corporation, Northampton, Mass. By the C.I.E.

polyester and styrene, by means of peroxide catalysts and metallic activators, said polyester consisting of condensation products of polycarboxylic acids and polyhydric alcohols, a nonaromatic unsaturation being present in either or both the acid and alcohol, the improvement which comprises using as metallic activators a mixture consisting essentially of the organic derivatives of vanadium and of zirconium, said derivatives being selected from the group consisting of the acetyl acetonates, octoates, and naphthenates, these activators being present in an amount, calculated with respect to the metal, of from 0.007 to 0.7% by weight with respect to the mixture of unsaturated polyester and styrene, the vanadium/zirconium ratio being within the range of from 1:0.2 to 1:2.0, the values being calculated with respect to the metal.

2. Process according to claim 1 in which the peroxide catalyst is added in a quantity of 0.5 to 3.0% by weight with respect to the mixture of unsaturated polyester and styrene.

3. Process according to claim 2 in which peroxide or hydroperoxide compounds are employed as hardening catalysts selected from cumene hydroperoxide, methylethylketone peroxide, ter-butyl peroxide and methylisobutylketoneperoxide.

4. Process according to claim 2 in which the styrene amount present is from 10 to 70% by weight with respect to said mixture.

5. Process according to claim 1 in which the vanadium metallic activator is a vanadyl derivative.

References Cited

UNITED STATES PATENTS

| 3,028,360 | 4/1962 | Brooks et al. | 260—863 |
| 3,079,363 | 2/1963 | Koch et al. | 260—863 |
| 3,238,274 | 3/1966 | Allen | 260—863 |
| 3,249,574 | 5/1966 | Meyer | 260—30.4 |
| 3,281,497 | 10/1966 | Joo et al. | 260—863 |
| 3,333,021 | 7/1967 | Geipert | 260—863 |
| 3,377,407 | 4/1968 | Kressin et al. | 260—863 |
| 3,445,410 | 5/1969 | Coulter | 260—21 |

OTHER REFERENCES

Kolczynski et al.: "Activated Decomposition of Organic Peroxides in Unsaturated Polyester Resins," 1969, 1–3.

WILLIAM H. SHORT, Primary Examiner

R. J. KOCH, Assistant Examiner

U.S. Cl. X.R.

156—332; 260—22 CA, 40 R